UNITED STATES PATENT OFFICE.

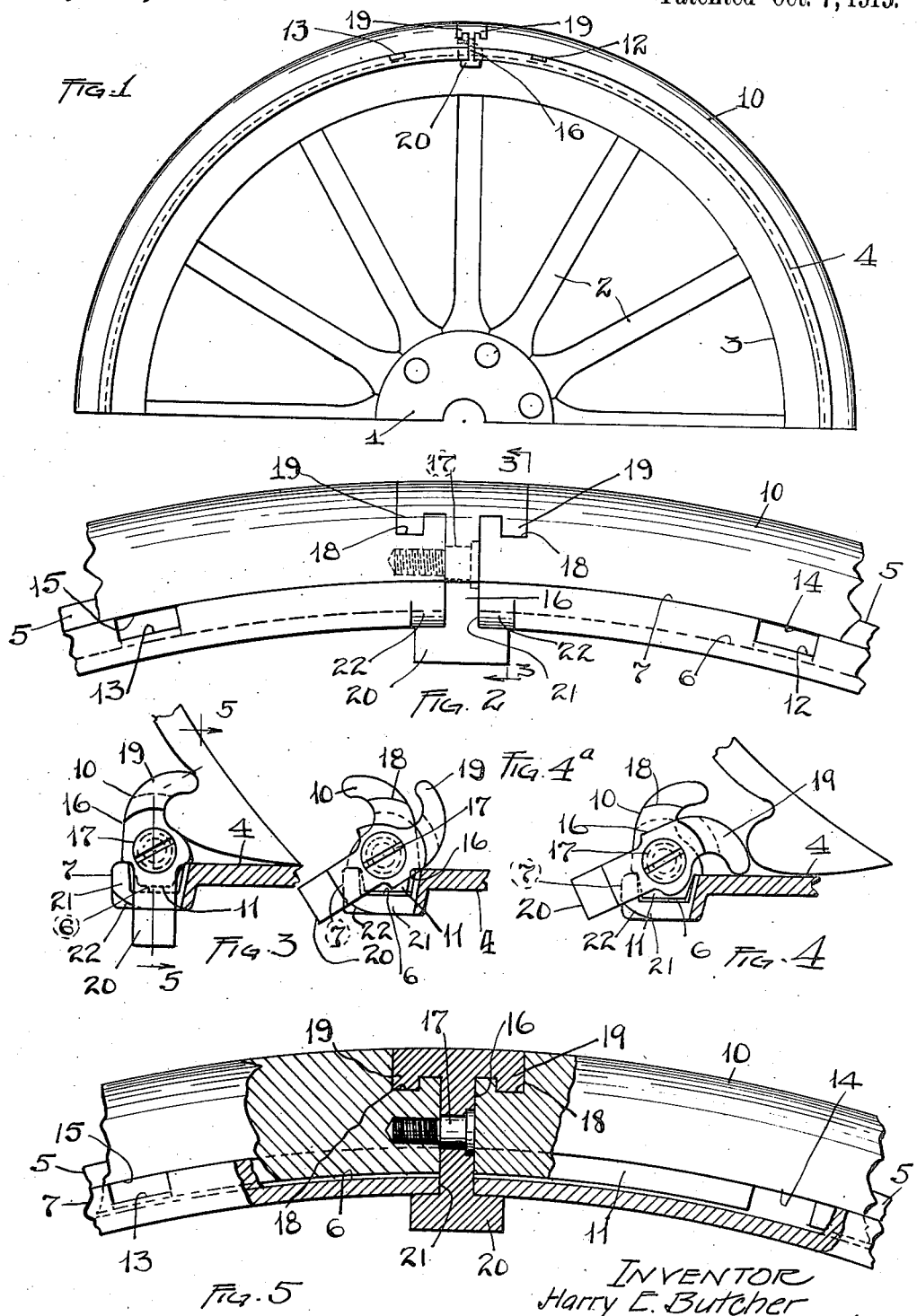

HARRY E. BUTCHER, OF CLEVELAND, OHIO, ASSIGNOR TO THE STANDARD PARTS COMPANY, OF CLEVELAND, OHIO, A CORPORATION OF OHIO.

VEHICLE-WHEEL RIM.

1,317,860.  Specification of Letters Patent.  Patented Oct. 7, 1919.

Application filed October 30, 1917. Serial No. 199,229.

*To all whom it may concern:*

Be it known that I, HARRY E. BUTCHER, a citizen of the United States, and a resident of Cleveland, county of Cuyahoga, and State of Ohio, have invented a new and useful Improvement in Vehicle-Wheel Rims, of which the following is a specification, the principle of the invention being herein explained and the best mode in which I have contemplated applying that principle, so as to distinguish it from other inventions.

The present improvements relate to vehicle wheel rims for supporting or carrying pneumatic tires, and more especially to so-called quick detachable rims or "Q. D." rims, as they are known to the automobile trade. These rims are largely used in connection with automobiles and the like, being characterized by having a side flange which is rendered detachable in order to facilitate the placing of a tire on, or its removal from the rim. The latter may be either a demountable rim or more or less permanently mounted on the wheel body, without, of course, affecting the so-called "Q. D." feature. The object of the present invention is to provide an improved locking device for securing such side flange or ring in place on the rim,—one that will be simple to construct and easy to operate, and, what is quite as important, involve no loose parts which are apt to become lost or misplaced.

To the accomplishment of the foregoing and related ends, said invention, then, consists of the means hereinafter fully described and particularly pointed out in the claims. The annexed drawing and the following description set forth in detail certain mechanism embodying the invention, such disclosed means constituting, however, but one of various mechanical forms in which the principle of the invention may be used.

In said annexed drawing:—

Figure 1 is a side elevational view of a portion of a wheel body showing a so-called quick detachable rim thereon embodying my improved construction; Fig. 2 is a side elevational view of such rim at the points where the ends of the split side flange or ring come together, showing the locking device in place; Fig. 3 is a transverse section of a portion of such rim showing one end of such side flange and such locking device in elevation; Figs. 4 and 4ª are views similar to Fig. 3, but showing the locking device in different operative positions; and Fig. 5 is a view similar to Fig. 2 but with the meeting ends of the side flange, the locking device, and the adjacent portion of the rim shown in section.

The construction of the wheel body, which is illustrated in part only in the aforesaid drawing, is a matter of indifference so far as the present invention is concerned, consisting, as shown, of the usual hub 1, spokes 2, and felly 3. The rim 4, which surrounds such felly, is preferably of the so-called "universal" type; that is it is provided with an abutment 5 around its rear edge (see Fig. 2), adapted to retain in place a continuous side flange or ring (not shown), which may be reversed to receive and hold either a straight-side or clencher tire, as desired. On the other hand, such rim may, of course, be provided with an integral side flange on such rear edge of either the straight-side or clencher type.

The front edge of the rim 4 is provided with an encircling groove or depression 6, conveniently formed by beading such edge, the outer wall 7 of the groove lying flush or slightly below the outer surface of the rim, so as to permit the reversible side flange (when one is used) to be slipped over it, as occasion may require.

The part of the structure which is of present interest, is the outer flange 10, that, as previously indicated, is transversely split at one point in its circumference, in order that it may be detachably secured to the rim, such flange having its inner edge 11 formed to seat in the aforesaid groove or depression 6, but being sufficiently resilient to permit its ends to be separated and the ring thus expanded until it can be removed from such groove. In order to permit the ring or flange to be pried out of the groove 6, the wall 7 of such groove is cut away to form notches 12 and 13 at points equally spaced from the point where it is desired to have the ends of the flange or ring meet; and the inner edge 11 of the flange or ring is cut away at corresponding points 14 and 15 (see Fig. 5), whereby a screwdriver or like implement may be inserted into the groove and beneath the corresponding end of the ring.

For the purpose of securing the ends of the flange 10 to the rim, as well as to each other, so as to hold such ends firmly in place, a locking member 16 of the form clearly shown in Figs. 2, 3, 4 and 5, is provided. This member may be aptly described as having the form of a capital letter T, and is pivotally secured to the one flange end by means of a screw or rivet 17 that passes through its stem so as to be oscillatory about an axis substantially tangential to the rim at the point in question.

This locking member, in end view, or in a radial cross-section, is of the same form as the flange or ring; in other words, when in the locking position shown in Fig. 3, the member will aline perfectly with the flange, and this will be the case irrespective of whether the flange be turned with the "clench" directed inwardly, as shown in the figure just referred to, or with such "clench" directed outwardly, as would be the case if the rim were to be employed in connection with a straight-side tire.

It will be further noted that not only is a sufficient space left between the ends of the flange or ring to accommodate the T-shaped locking member, but also that the outer corners of such flange ends are cut away or notched at 18 to interlock with the respective down-turned ends 19 of the cross head of the T, as best shown in Fig. 5. These notches 18 have their bottoms cut on a circle with the axis of the locking member as a center, so that a snug fit between such cross head and the flange-ends is assured. The lower end of the locking member is also provided, as shown, with a cross head, or rather foot 20, corresponding with the base of the letter T, and the wall 7 and bottom of the groove 6, are cut away or notched to provide a recess 21, through which the lower portion of the stem may swing with this foot in close fitting engagement with the under side of the bead. The portions 22 of the latter adjacent the respective edges of the recess, are cut away or rounded to permit close fitting engagement between this foot and the bead.

Having thus described the construction of my improved device, the method of its operation may be readily explained. It has already been indicated that the side flange 10 is reversible; that is that it may be put on the rim with its concave face directed either inwardly or outwardly as desired, in order to adapt the rim to receive a clencher or straight-side tire, as the case may be. When thus placing the flange on the rim, the end having the locking member 16 attached thereto will preferably be applied first, so as to insure the correct location of the locking member with respect to the notch or recess 21 in the bottom of the groove 6. The other end of the flange, which of course is free from the locking member, is then brought into juxtaposition with such first end, the locking member being tilted inwardly into the position shown in Fig. 4. Thereupon by swinging said locking member back into its normal position, as shown in Fig. 3, not only will the T-head interlock with the recesses 18 in the respective flange-ends, but the foot 20 of the T will interlock with the bottom wall of the groove 6. The locking member will be retained in its normal position by the bead of the tire, even when the latter is not inflated, since there is practically no tendency for the member to tilt inwardly, and the frictional engagement of the foot with the bead has a certain locking effect. However the inflation of the tire, by forcing the casing solidly against the flange and upper portion of the locking member, will absolutely prevent the displacement of the latter.

Before the flange can be unlocked, it of course will be necessary to deflate the tire in order that the locking member may be tilted inwardly. Figs. 4 and 4$^a$ illustrate this position of the device, with the flange turned to receive a straight-side and a clencher tire, respectively. The operative feature just referred to serves to prevent accidents where it is attempted to pry off the flange prematurely—that is before deflating the tire, as is sometimes done with types of locking devices currently in use. In addition, the locking device in hand remains at all times attached directly to the ring or flange so that there is no danger of its becoming lost, and there are no other loose parts involved in the device. Furthermore no special tool is required to operate the device, since a very slight tap with any blunt implement, or even the pressure of a finger, will suffice to tilt the locking member inwardly, when the tire is deflated and the adjacent bead of the casing moved out of the way.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. The combination with a wheel rim; of a side-flange removably mounted on said rim; and means adapted to secure said flange to said rim, said means including a member movably attached to one end of said flange and adapted in one position to interlock with both the other end of said flange and with said rim.

2. The combination with a wheel rim; of a side-flange removably mounted on said rim; and means adapted to secure said flange to said rim, said means including a member movably attached directly to one end of said flange and adapted to interlock with said rim.

3. The combination with a wheel rim; of a side flange removably mounted on said rim; and means adapted to secure said flange to said rim, said means including a member oscillatorily attached to one end of said flange about an axis substantially tangential to said rim and adapted in one position about such axis to interlock with the other end of said flange.

4. The combination with a wheel rim; of a side flange removably mounted on said rim; and means adapted to secure said flange to said rim, said means including a member oscillatorily attached to one end of said flange about an axis substantially tangential to said rim and adapted in one position about such axis to interlock with both the other end of said flange and with said rim.

5. The combination with a wheel rim; of a side flange removably mounted on said rim; and means adapted to secure said flange to said rim, said means including a member oscillatorily attached to one end of said flange about an axis substantially tangential to said rim and adapted in one position about such axis to interlock with said rim.

6. The combination with a wheel rim; of a side-flange removably mounted on said rim; and means adapted to secure said flange to said rim, said means including a member of T-shape in a section parallel with the plane of the wheel and oscillatorily attached through its stem directly to one end of said flange, the head and foot of said member being adapted to interlock with the other end of said flange and with said rim, respectively, in one position of said member.

7. The combination with a wheel rim; of a side-flange removably mounted on said rim; and means adapted to secure said flange to said rim, said means including a member having the same transverse section as said flange and of T-shape in a section parallel with the plane of the wheel, said member being oscillatorily attached through its stem directly to one end of said flange and normally retained by the tire with its head and foot in interlocking engagement with the other end of said flange and with said rim, respectively, said member being oscillatory, upon deflation of the tire, to release said other flange end and rim.

8. The combination with a wheel rim; of a side-flange removably mounted on said rim; and means adapted to secure said flange to said rim, said means including a member having the same transverse section as said flange and of T-shape in a section parallel with the plane of the wheel, said member being oscillatorily attached through its stem directly to one end of said flange and normally retained by the tire with its head and foot in interlocking engagement with the two flange-ends and with said rim, respectively, in one position of said member.

9. The combination with a wheel rim; of a side-flange removably mounted on said rim; and means adapted to secure said flange to said rim, said means including a member having the same transverse section as said flange and of T-shape in a section parallel with the plane of the wheel, said member being oscillatorily attached through its stem directly to one end of said flange and normally retained by the tire with its head and foot in interlocking engagement with the two flange-ends and with said rim, respectively, said member being oscillatory, upon deflation of the tire, to release said other flange end and rim.

10. In a vehicle wheel rim having a split detachable side-flange, a lock for securing said flange in place comprising a member movable into and out of direct interlocking engagement with the juxtaposed ends of said flange and simultaneously with the rim, substantially as described.

11. In a vehicle wheel rim having a split detachable side-flange, a lock for securing said flange in place comprising a member of T-shape having its head and foot movable into and out of direct interlocking engagement with the juxtaposed ends of said flange and simultaneously with the rim, substantially as described.

Signed by me, this 25 day of October, 1917.

HARRY E. BUTCHER.